United States Patent [19]

Federmann et al.

[11] 4,421,497

[45] Dec. 20, 1983

[54] FIBER-REINFORCED DRIVE SHAFT

[75] Inventors: Helmut Federmann, Bergisch Gladbach; Joachim Bausch, Duerscheid, both of Fed. Rep. of Germany

[73] Assignee: Felten & Guilleaume Energietechnik GmbH, Cologne, Fed. Rep. of Germany

[21] Appl. No.: 203,669

[22] Filed: Nov. 3, 1980

[30] Foreign Application Priority Data

Nov. 17, 1979 [DE] Fed. Rep. of Germany ....... 2946530

[51] Int. Cl.³ ............................ F16C 3/00; F16C 3/16
[52] U.S. Cl. .................................. 464/181; 138/109; 464/183
[58] Field of Search ............................... 464/179–183; 138/109, 172, 174

[56] References Cited

U.S. PATENT DOCUMENTS

| 1,594,579 | 8/1926 | Timbs et al. | 464/183 X |
| 3,067,593 | 12/1962 | McCool | 464/183 |
| 4,131,701 | 12/1978 | Van Auken | 464/183 X |
| 4,238,539 | 12/1980 | Yates et al. | 464/181 X |
| 4,272,971 | 6/1981 | Loyd et al. | 464/181 |
| 4,279,275 | 7/1981 | Stanwood et al. | 464/181 X |

Primary Examiner—John Petrakes
Attorney, Agent, or Firm—Michael J. Striker

[57] ABSTRACT

A drive shaft for motor vehicles has a tubular shaft portion of synthetic plastic resin in which fibers are embedded. Metallic end pieces are in part received in and bonded to the shaft portion; connecting elements can be connected to the parts which project outwardly from the shaft portion. A method of making this shaft is also disclosed.

10 Claims, 3 Drawing Figures

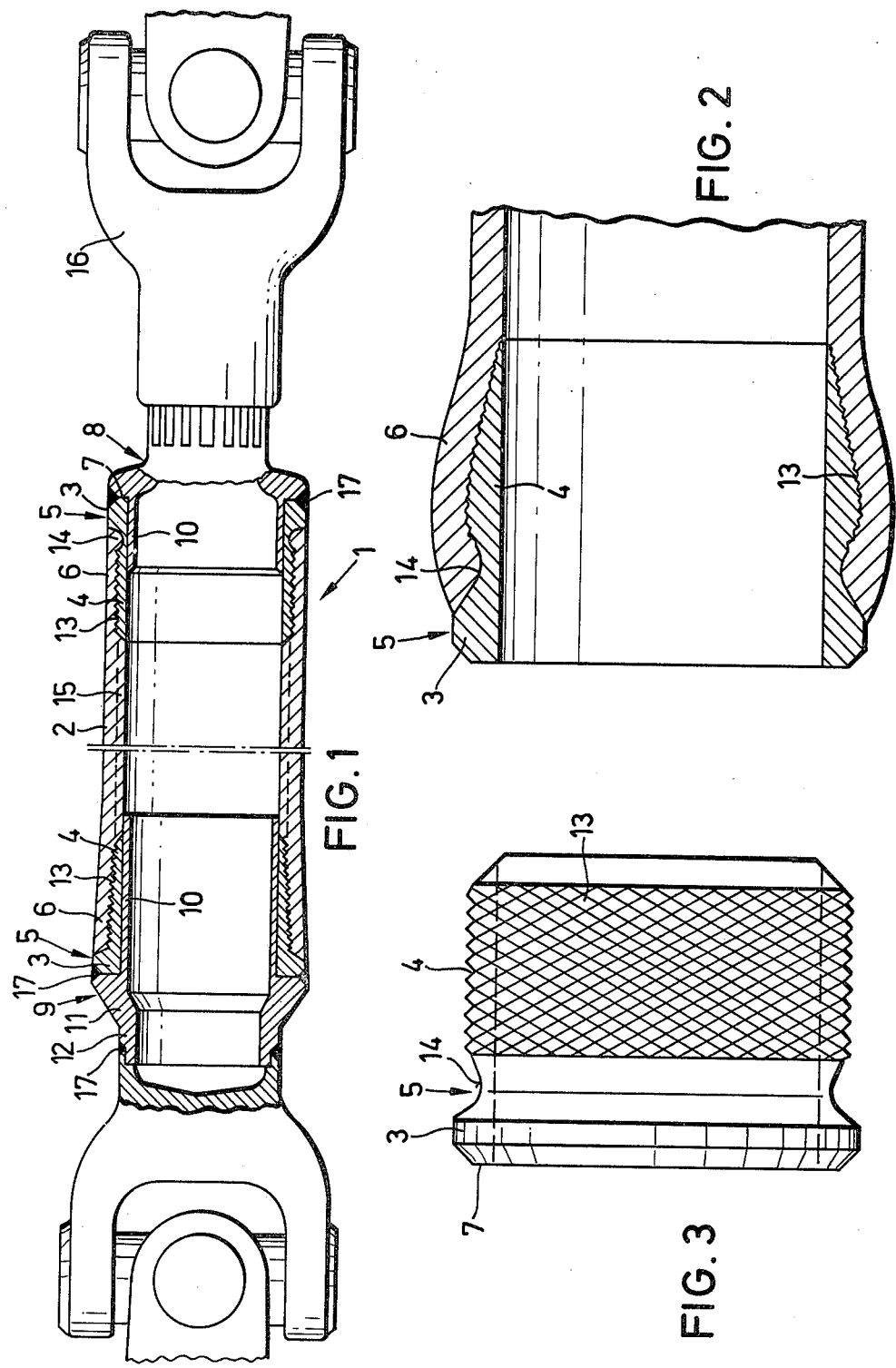

FIBER-REINFORCED DRIVE SHAFT

BACKGROUND OF THE INVENTION

This invention relates to fiber-reinforced driveshafts, particularly—but not exclusively—cardan shafts and analogous drive shafts for motor vehicles.

More especially, the invention relates to a drive shaft of fiber-reinforced synthetic plastic material, and to a method of making the same.

Fiber-reinforced synthetic plastic drive shafts are not entirely new. German Published Application DE-OS No. 2,851,292 discloses a cardan-shaft of this type which has the advantage of exhibiting better vibratory characteristics than comparable metal cardan shafts, and of having a lower weight with a consequent improvement in performance and in fuel use. However, for each engine type a separate cardan shaft must be produced or stocked, so that the above-mentioned advantages are in part negated by the greater manufacturing and/or stock-keeping efforts required.

Another fiber-reinforced synthetic plastic cardan shaft is known from German Published Application DE-OS No. 2,851,293. There, ring-shaped metallic end pieces are inserted over the major part of their length into the ends of a fiber-reinforced tubular shaft of synthetic plastic material. The end pieces are mounted on a mandrel at a distance corresponding to the length desired for the finished shaft, the glass-fiber-reinforced synthetic plastic material is applied over the mandrel and the major portion of the length of each end piece, and is then hardened. Thereupon the shaft is pulled off the mandrel and the projecting portions of the end pieces are welded to connecting elements (such as the yoke of a cardan joint) and finally the shaft is balanced to make it run "in the round".

A problem encountered in connection with this prior-art disclosure, is that it is difficult to so fix the end pieces on the mandrel at the required spacing (without resorting to complicated devices) that the shaft can subsequently be pulled off the mandrel without damaging the same. For this reason, throw-away mandrels are used which are left in the shaft. This, however, creates another problem, in that such mandrels increase the weight and cost of the finished shaft without, however, increasing its mechanical strength. Also, the simple application of the glass-fiber reinforced synthetic plastic in form of a coating over the mandrel and the end pieces, does not (after hardening) assure the high mechanical strength—especially torsion and bending resistance—which is desirable for drive-shaft applications. To achieve this a special structure and orientation of the reinforcing fibers is needed, which is not disclosed in the reference.

Also, the end pieces are anchored in the tubular shaft only by relatively low, primarily adhesive forces. The very sensitive end faces of the tubular shaft are exposed to all ambient influences and thus subject to damage. The multiple abrupt transitions from the cross-section of the end pieces to the cross-section of the tubular shaft are a problem, especially where the shaft cross-section is reduced at the inner end of each end piece, i.e. just where the torque is transmitted between the end pieces and the shaft. This leads to locally excessive thrust which may cause a destruction of the shaft in this critical transition zone. For these reasons the known cardan shaft does not have sufficient tensile, compressive shear, bending and torsional resistance to withstand the very high mechanical loads acting upon a cardan shaft, for a sufficient length of time. Destruction may occur after only a relatively short period of use.

SUMMARY OF THE INVENTION

It is an object of the invention to overcome the disadvantages of the prior art.

A more particular object of the invention is to provide an improved fiber-reinforced synthetic plastic drive shaft which retains the desirable advantages of such shafts, can be readily made to required sizes, and has substantially improved mechanical strength, especially in the transition zones between the tubular shaft and its metallic end pieces.

Another object is to provide an improved method of making such a shaft.

Pursuant to the above objects, and still others which will become apparent hereafter, one aspect of the invention resides in an improved fiber-reinforced drive shaft of synthetic plastic material with metallic end pieces. Briefly stated such a shaft may comprise a tubular shaft composed of fiber-reinforced synthetic plastic resin and including a plurality of wound layers of resin-impregnated fibers, with the windings of the inner and outer layers being helical and having a low pitch, but for intermediate layers with a pitch angle of about 30°–60° and with the windings of successive layers crossing one another; a metallic end piece at each axial end of the tubular shaft and having a smaller-diameter inner anchoring portion received in the respective axial end bonded thereto, and a larger diameter outer ring portion of one piece with the anchoring portion, the ring portion having an axial end face facing towards and bonded to the adjacent end face of the tubular shaft so as to protect the same against ambient influences.

The method according to the invention may comprise the steps of applying a coating of parting agent to a rotatable mandrel; placing a pair of end pieces at requisite axial spacing onto the mandrel; heating the mandrel; winding a plurality of layers of hardenable resin-impregnated fiber material about the mandrel and about portions of the end pieces, in form of windings which have different angles of inclination to the axis of rotation of the mandrel; hardening the resin material; cooling the mandrel; and pulling off the finished drive shaft.

The improved shaft according to the invention combines the above-mentioned advantages of fiber-reinforced synthetic plastic drive shafts with those of the more conventional steel cardan shafts. Its weight is substantially lower than the weight of steel shafts but its ends with the inserted metallic end pieces have a mechanical strength comparable to that of steel shafts. With the use of adapters such shafts can be employed with connectors of different dimensions and/or different cross-sections. The connection of the end pieces with the tubular shaft is extremely strong and resistant to destruction. The special configuration of the extension of the end pieces (to be discussed later herein) achieves a gradual cross-sectional transition from the end pieces to the tubular shaft, which in turn assures that the thrust is constant over the entire range of the connection between the metallic end pieces and the tubular shaft.

The shaft according to the invention has a low weight, so that such shafts can be used in much greater lengths than before without encountering significant vibrations, and the previously required use of an intermediate bearing with consequent separation of the shaft into sections, is avoided. The new shaft can extend in one piece from e.g. the gear shift in the front area of a motor vehicle to the differential in the rear area of the vehicle, a cardan joint being provided at each location to which the shaft is connected. The shaft weight can be further reduced by the use of especially light-weight metals—e.g. an appropriate aluminum alloy—for the metallic end pieces (and the adapter parts, if necessary).

Resort to the inventive method permits a substantially simplified and more economical production of drive shafts of the type under discussion.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a partly sectional side view of a shaft according to the invention;

FIG. 2 is a fragmentary longitudinal section through another embodiment of the invention; and FIG. 3 is a side view, showing a part of still a further embodiment of the invention.

DESCRIPTION OF PREFERRED EMBODIMENTS

The invention will hereafter jointly be described with reference to the structural embodiments and to the method of making the same.

One embodiment is shown in FIG. 1, where the drive shaft 1 is composed of a tubular part 2 of fiber-reinforced synthetic plastic material, which is provided at its opposite ends with end pieces 5 of metal. To each of these a connecting element 8—e.g. the yoke part of a cardan joint or a grooved stub shaft—is welded, either directly or indirectly. Each of the end pieces has a rotationally symmetrical ring portion 3 and a sleeve-like extension portion 4 which is anchored in the adjacent end section 6 of the shaft 2 and firmly enhanced thereby, so that only the ring portions 3 project from the shaft 2 at the ends thereof.

An adapter part 9 can have its centering portion 10 extend one of the end piece 5 (the same can, of course, also be done at the other one); part 9 can be permanently welded to end piece 5 by means of a circumferential weld 17. Each adapter part 9 has a cylinder portion 12 of different diameter and a transition portion 11 connecting portion 12 in one piece with the centering portion 10. The connecting element 8, here a yoke part of a cardan joint, is connected to cylinder portion 12 via a weld 17 or a circumferential solder joint.

The end pieces 5 can be identical, or they can be different from one another. In FIG. 1 they are shown to be different. The end piece 5 at the left end of the shaft 2 has its extension 4 conically shaped and its surface roughened (or formed with teeth or a helix), the end section 6 of the shaft 2 accommodating itself precisely to the slope of the surface during winding, so that a firm anchoring is achieved. An essential advantage of this resides in the gradual cross-section increase in this transition range of the torque from the metallic end pieces to the fiber-reinforced plastic part 2, and vice versa.

The end piece 5 at the right-hand end of the shaft in FIG. 1 has its extension 4 of cylindrical shape, the surface thereof being formed with threads 13 and, in the transition region to the ring part 3, with an annular groove 14. Threads 13 and groove 14 serve for firm anchoring of the end piece 5 in the end portion 6 of shaft 2. An advantage of this embodiment is that it can be economically produced in large series and offers improved abutment against an end face of an intermediate tube, if such a tube is used to facilitate the winding operation. The windings can be applied without previous filling-in of the space between the end pieces (and abut the mandrel); therefore, the use of a tube allows the application of each winding in a single continuous layer over the entire length of part 2, including its end sections 6.

A connecting element 8 in form of a grooved stub shaft with a centering part 10 fitting into the end piece 5, is directly connected to the right-hand end piece 5; it is permanently secured in place via an annular welded seam 17 or a solder seam. The yoke part 16 of a cardan joint is axially slidably mounted in this stub shaft. Such an arrangement permits the transmission of high torque and via element 8 compensates for movement-dependent fluctuations in the spacing between the parts connected by the drive shaft, e.g. the gear shift and the differential of a moving vehicle. If the element 8 is compatible with the end piece 5, then it can be directly welded thereto without requiring an adapter 9.

In FIG. 2 the end piece 5 has a conical outer surface on its part 4. The groove 14 in the region of transition to part 3 is more pronounced than in FIG. 1. The conical outer surface of part 4 is uneven, due to the provision of grooves, teeth, depressions, or the like, e.g. a number of shallow grooves. This embodiment combines the advantage of a gradual transition of the cross-section and accordingly of the transmitted torque, from the metallic end pieces to the shaft 2, with a particularly firm anchoring due to the pronounced groove 14 in which parts of the shaft 2 are firmly embedded. This embodiment is therefore especially well suited for withstanding axially acting tensile forces.

Finally, in the embodiment of FIG. 3 the end piece 5 resembles the one shown at the right side of FIG. 1. It differs therefrom by a slight inclination of the inner end face of the ring part 3 and knurling of its cylindrical surface. An end piece 5 of this type can be produced at minimum cost on e.g. a turning lathe and when connected with the shaft 2 results in a drive shaft which is sufficiently strong for all usual applications.

In all embodiments the required connecting element 8 is inserted either directly or via an adapter 9 into the respective end piece 5, until it abuts the outer end face 7 thereof, whereupon it is permanently secured by the circumferential weld or solder seam 17. The shafts including their end pieces 5, are produced in large quantities in different standard lengths, and in a separate operation the connecting elements 8 needed for a particular application, are affixed. This eliminates the need to stock many completed drive shafts with differently constructed or dimensioned joint parts, e.g. parts of a cardan joint.

The end pieces 5 are pushed onto a rotatable cylindrical mandrel until they have the requisite axial spacing, and are then secured against relative turning, which may be done by heating the end pieces 5 prior to putting them on the mandrel, and cooling the mandrel before the finished shaft is pulled off it. Thereafter, so-called "prepreg" fibers (known per se) or high-strength fiber bundles, fabrics or mats are soaked with a highly viscous heat-hardenable synthetic resin and are then wound onto the mandrel intermediate the end pieces 5, as well as on those parts of the end pieces which are to be embedded in the hollow tubular shaft. These windings are applied in form of several layers which are inclined to the axis of rotation. It is particularly advantageous if the fibers or fiber bundles (or layers, fabrics, mats) are wound in closely consecutive windings in the innermost and outermost layers with as low as possible a pitch. This permits all unevennesses serving for anchoring purposes—e.g. an annular groove on each metallic end piece—to be filled, thereby obtaining good adhesion, and obtaining a gradual transition towards the extension of the end pieces 5. The portions of the end pieces 5 which project from the windings serve with their axially inner end faces as protection for the end faces of the finished winding. The similarly wound outer layer tightly surrounds and forms a surface layer for the adjacent layers of the thus produced tubular shaft.

In the production of the intermediate layers the resin-soaked fibers or fiber compounds are wound with a pitch of 30°–60°, with the fibers of consecutive intermediate layers being wound in mutually opposite direction so as to cross the turns of the preceding layer. A pitch angle of 45° has been found to be particularly advantageous, according to which successive intermediate layers are wound with turns which cross one another in direction normal to each other. It is also advantageous if, after at least two crossing layers have been wound, a layer of fiber matting or of high-strength fabric soaked with the hardenable resin is applied, over which further fiber layers with mutually crossing windings are applied.

When the main (i.e. tubular) part 2 of the shaft is constructed in this manner, it offers to a particularly high degree the desired mechanical strength; it also assures an absolutely non-turnable anchoring of the end pieces in the ends of the tubular shaft. Only portions of the end pieces 5—having about the same outer diameter as the tubular shaft—project from the same in axial direction. The sensitive end faces of the hollow shaft, composed of the fibers—e.g. glass fibers—embedded in the resin matrix firmly adhere to the axiall inner end faces of these end pieces and are thus protected.

The resin-soaked fiber windings are heated immediately during application if "prepreg" fibers are used, to effect hardening of the resin. If other resin-soaked fibers or fiber agglomerations are used, heating is effected after the winding is fully completed. When hardening is finished, the shaft is pulled off the mandrel, which may be cooled if necessary. Among the suitable resins are those which are initially flowable, especially viscous; for example, resins on polyester basis, on the basis of vinyl ester or epoxy, or other suitable resins known per se.

Suitable reinforcing fibers include glass fibers, carbon fibers, high-strength synthetic plastic fibers such as aromatic polyamide based on m-phenyldiamine and terephthalic acid (commercially available under the tradename "KEVLAR"), or a combination of two or more different types of these fibers.

Prior to initiation of the winding operation the end pieces 5 are pushed onto the mandrel and secured thereon at the required axial spacing. To prevent adhesion of the inner winding layer to the polished, hardened surface of the mandrel which consists of special steel, so as to facilitate pulling-off of the finished shaft, a thin coating of a parting agent—e.g. silicone grease—is applied to the mandrel surface prior to installation of the end pieces.

According to another embodiment a length of tubing—of fiber-reinforced synthetic plastic or the like and having an inner diameter corresponding about to the outer diameter of the mandrel, and an outer diameter corresponding about to that of the end piece extension—may be placed about the mandrel intermediate the end pieces. The first resin-soaked fiber layer is then wound onto the tube and the end pieces 5 and subsequent layers follow until the required thickness is reached. On hardening of the resin the innermost layers become an inseperable unitary whole with the end pieces and the tube. This method is especially well suited for making drive shafts having special cross-sectional requirements. The tube can perform the function of the mandrel and the end pieces can be installed in a turnable jig and be pressed towards one another and against the ends of the tube during the winding operation. The tube may also consist of hard paper, synthetic plastic or light-weight metal.

Irrespective of the manufacturing method used, once the resin has been hardened the connecting elements 8—e.g. yokes of a cardan joint—are inserted into the end pieces 5 and welded thereto with the circumferential weld 17, either directly or via interposed rotationally symmetrical adapter parts 9. The thus produced drive shaft is then rotated at high speed and balanced by e.g. local removal of material and/or insertion of lead into bores of its metal parts, especially its end pieces 5.

While the invention has been illustrated and described as embodied in a fiber-reinforced drive shaft for motor vehicles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. Drive shaft, particularly for motor vehicles, comprising a tubular shaft composed of fiber-reinforced synthetic plastic resin and including a plurality of wound layers of resin-impregnated fibers, with the windings of the inner and outer layers being helical and having a low pitch, but for intermediate layers with a pitch angle of about 30°–60° and with the windings of successive layers crossing one another; a metallic end pieces at each axial end of said tubular shaft and having a smaller-diameter inner anchoring portion received in the respective axial end and bonded thereto, and a larger-diameter outer ring portion of one piece with the anchoring portion, said ring portion having an axial end face facing toward and bonded to the adjacent end faces of said tubular shaft so as to protect the same against ambient influences.

2. Drive shaft as defined in claim 1, said anchoring portion and said ring portion having identical inner diameters.

3. Drive shaft as defined in claim 1, said tubular shaft including at least one resin-impregnated fiber layer interposed between two successive ones of said wound layers.

4. Drive shaft as defined in claim 1, wherein said pitch angle is 45° and the windings of successive layers cross one another substantially in direction normal to each other.

5. Drive shaft as defined in claim 1, said anchoring portion having a constant inner diameter and an outer diameter which decreases in direction inwardly of said tubular shaft.

6. Drive shaft as defined in claim 5, said anchoring portion having an outer surface which conically converges in direction axially inwardly of said tubular shaft.

7. Drive shaft as defined in claim 5, said anchoring portion having an outer surface which converges stepwise in direction axially inwardly of said tubular shaft.

8. A drive shaft as defined in claim 5, said anchoring portion having an outer surface which arcuately converges in direction axially inwardly of said tubular shaft.

9. Drive shaft as defined in claim 1, said anchoring portion being cylindrical and having an outer surface provided with roughened areas, said ring portion having a bevelled circumferential end face.

10. Drive shaft as defined in claim 1, said end pieces each having an outer circumferential groove in the region of a transition between the respective anchoring portion and ring portion.

* * * * *